US007548492B2

(12) United States Patent
Igi

(10) Patent No.: US 7,548,492 B2
(45) Date of Patent: Jun. 16, 2009

(54) OPTICAL DISK RECORDING/REPRODUCTION DEVICE AND SEARCH METHOD FOR INFORMATION RECORDING AREA OF OPTICAL DISK IN THE SAME

(75) Inventor: Yasumasa Igi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 757 days.

(21) Appl. No.: 11/217,445

(22) Filed: Sep. 2, 2005

(65) Prior Publication Data

US 2006/0077797 A1  Apr. 13, 2006

(30) Foreign Application Priority Data

Sep. 3, 2004  (JP) ............................. 2004-256405

(51) Int. Cl.
*G11B 7/00* (2006.01)
(52) U.S. Cl. .................... 369/44.27; 369/47.4; 369/53.4
(58) Field of Classification Search ............. 369/53.24, 369/44.27, 44.28, 47.27, 47.28, 47.4, 53.4, 369/53.39, 53.43
See application file for complete search history.

(56) References Cited

U.S. PATENT DOCUMENTS 6,678,221 B2 * 1/2004 Fujimoto ................. 369/44.29

2004/0001401 A1  1/2004  Yamaguchi

FOREIGN PATENT DOCUMENTS

JP  2003-263755  9/2003

\* cited by examiner

*Primary Examiner*—Nabil Z Hindi
(74) *Attorney, Agent, or Firm*—Crowell & Moring LLP

(57) ABSTRACT

The optical disk recording/reproduction device is provided with an information recording area search means, comprising, a moving means which detects the presence and absence of information and return moves an optical pickup from inward to outward or from outward to inward direction of an optical disk, and a stopping means which stops the movement of optical pickup if an information recording area is detected in the movement of optical pickup. If the existence of information cannot be confirmed at a re-zeroing position in the initial operation, the optical pickup is moved to the inward of optical disk at a normal velocity; when the optical pickup passes through the information recording area, it is braked and stopped. If the existence of information can be confirmed at the stop position, the flow is shifted to normal reproduction; if it cannot be confirmed, the optical pickup is determined to pass through the information recording area and stop, returned from the stop position and moved outward at a low speed. In the outward movement, the moving velocity is switched to the minimum velocity nearby the position of information recording area detected in the first inward movement. Thus, the recording information is surely searched and read in the initial operation even if the optical disk has only extremely small information recorded thereon.

3 Claims, 6 Drawing Sheets

OPTICAL DISK RECORDING/REPRODUCTION DEVICE AND SEARCH METHOD FOR INFORMATION RECORDING AREA OF OPTICAL DISK IN THE SAME

BACKGROUND OF THE INVENTION

1. Field of the Invention

The present invention relates to an optical disk recording and/or reproduction device performing recording and/or reproduction of information for optical disks such as CD (Compact Disk) and DVD (Digital Versatile Disk).

2. Description of the Related Art

Conventionally, there have heretofore been known optical disk recording and/or reproduction devices that carry out the recording and/or reproduction of information by means of an optical head known as an optical pickup for optical disks such as CD and DVD, where information recording tracks are formed in a shape of concentric circles or a spiral shape. The optical pickup is constructed such that it converges and irradiates light from a semiconductor laser, etc. onto an optical disk via an objective lens, receives the reflected light of the light irradiated onto the optical disk, outputs a corresponding electric signal, and is moved in the radial direction of the optical disk.

The optical disk recording/reproduction device carries out the recording and/or reproduction of information for the optical disk by converging and irradiating light from the optical pickup onto the recording tracks of optical disk while moving the optical pickup to a defined position on the optical disk and rotating the optical disk.

In the reproducing information from the optical disk, first, a convergent point of light irradiating from the optical pickup is focused (focused-on)/(focus led-in) so that it is located on the optical disk surface and further tracked on (track led-in) so that the focused light is located on a recording track. Such focusing-on and tracking-on are carried out by moving the objective lens in a direction perpendicular to the optical disk surface and a direction perpendicular to the recording track in accordance with electric signals output from the optical pickup. At this time, pits formed on the optical disks are detected based on the electric signal output from the optical pickup in the focused-on and tracked-on state, by which information is read and reproduced from the optical disk. The recording of information onto the optical disk is carried out by forming the pits on the recording tracks of optical disk with the light converging and irradiating from the optical pickup onto the optical disk.

Usually, information showing the recorded contents of optical disk, information of an operational program, etc. are recorded on the inner-most side of recording tracks in an optical disk exclusively for reproduction where music and images are pre-recorded. This information is referred to as the TOC (Table of Contents), and the information is also sequentially recorded from the inner-most side of recording tracks in a case of an optical disk capable of recording information on the user side.

Therefore, for example, when the optical disk is mounted to the main body of optical disk recording/reproduction device, it performs the initial operation of reading information (TOC, etc.) recorded on the inner-most side of optical disk, determines the type and recording contents of optical disk based on information read by this initial operation, and controls subsequent information recording and reproduction operations. In this initial operation, light from the optical pickup is focused on and tracked on at a defined initial position (re-zeroing position) which is given some margin and becomes peripherally only a little farther out than the inner-most side of the recording tracks. The most inward position of the recording tracks is defined by making the optical pickup contact with a fixed mechanical switch provided in the optical disk recording/reproduction device.

In this initial operation, when there is only a little information recorded at the inner-most side of the optical disk, tracking on (track-leading in) sometimes cannot be accomplished even if the focusing can be done. To solve this problem, a technique has been proposed in which an optical pickup is moved from a re-zeroing position inward in the focused-on state and the movement of optical pickup is stopped when a normal pit cycle (period) is confirmed has been proposed (reference Japanese Laid-Open Patent Publication No. 2003-263755).

In the above-mentioned conventional optical disk recording/reproduction device, when a recorded optical disk is mounted to a device on the user side and there is only an extremely small amount of information recorded on the optical disk, the recording position becomes more inward than the re-zeroing position where light from the optical pickup is focused in the initial operation, and the optical pickup becomes encounters an (unreadable) error. For example, when a user records a short article or data of one photo on CD-R, the data is received on one to several recording tracks at the inner-most side of optical disk. In such a case, pits are frequently not formed in the re-zeroing position where the optical pickup is focused. Therefore, the disk cannot be tracked-on even if it should be. Consequently there is a drop in focusing and the recorded information cannot be read. When there is a drop in focusing, the focusing on operation is re-run and retried many times, but the position of optical pickup does not change, and in many cases the information cannot be read, even if retried.

Accordingly, the optical pickup is moved inward (or outward) to search tracks where a small amount of information is recorded if the information is not read by the optical pickup stopped in the re-zeroing position. In the technique of the above-mentioned reference, when normal reading cannot be accomplished in the re-zeroing position, the optical pickup is moved from the re-zeroing position inward in the focused-on state, and when a normal pit period can be confirmed, the movement of optical pickup is stopped.

However, when the information on the optical disk surface is extremely small, at from one to several tracks, as described above, even if the existence of information is detected based on the analysis of an output signal (RF signal, track cross signal, etc.) from the moving optical pickup and the optical pickup is braked to a stop at the detected time, the optical pickup stops at the position after passing tracks where the information already exists. Once the optical pickup has passed the tracks and pits are not formed in the stop position, an error occurs. To resolve this problem, the moving velocity of the optical pickup must be lowered, causing other problem that the time required for an information search extends.

Moreover, in the technique shown in the above-mentioned reference, the optical pickup is moved while confirming the pit period, therefore the optical pickup must be moved for a specified or greater distance in order to grasp the period of pits, and whether tracks recorded with information exists is determined afterward for a part where movement has ended. Accordingly, when the quantity of information on the optical disk is extremely small, even if the existence of information is detected and the optical pickup is braked to a stop, the optical pickup frequently passes the part where information already exists (information recording area) in the stopping position, the information is not read, and the possibility of error is high.

SUMMARY OF THE INVENTION

In order to overcome the problems referred to above, an object of the present invention is to provide an optical disk recording/reproduction device in which an extremely small amount of information can be surely searched in the initial operation for reading information recorded on the inner-most side of an optical disk, and in which the required search time is also short, even if the optical disk has an extremely small amount of information recorded thereon, and to provide a search method for the information recorded area on an optical disk in an optical disk recording/reproduction device.

To accomplish these aspects, the present invention is related to an optical recording/reproduction device having a spindle motor which rotates an optical disk where recording tracks are formed in a shape of concentric circles or a spiral shape, an optical pickup which irradiates a light for performing the recording and/or reproduction of information for the optical pickup, receives a reflected light from the optical disk, converts it to an electric signal and outputs the signal, a mobile motor which moves the optical pickup on the optical disk, a focus controller which focuses on a light irradiated from the optical pickup so as to locate a convergent point of the light on the optical disk, a tracking controller which tracks on the focused-on light so as to locate it on the recording tracks, an information reading means which reads information recorded on the optical disk based on the electric signal output from the optical pickup in the tracked-on state, and an initial operation means which focuses on and tracks on the light from the optical pickup at an outer re-zeroing position only at a defined distance from the inner-most side of recording tracks of the optical disk when the disk is mounted to the device, and performs the reading of information from the optical disk, the device comprises: the initial operation means includes; an information detection means which detects the presence or absence of information recorded on the optical disk based on an output signal from the optical pickup in the focused-on state, and an information recording area search means which performs the reading of the tracked-on information if information exists on the optical disk as a result of detection at the re-zeroing position by the information detection means, detects the presence or absence of information by the information detection means in real time while moving the optical pickup in inward or outward direction of the optical disk in the focused-on state if no information exists on the optical disk, and stops the optical pickup to an area having information on the optical disk; the information recording area search means includes; a moving means of optical pickup which repeatedly moves the optical pickup from the inward to the outward direction of optical disk or from the outward to the inward direction of optical disk while detecting the presence or absence of information by the information detection means, and a stopping means of the optical pickup which stops the movement of optical pickup if the information recording area having information is detected on the optical disk by the information detection means.

According to the present invention, an extremely small amount of information (about several tracks) can be surely searched and read in the initial operation even if the optical disk has only an extremely small information recorded thereon. Moreover, the time required for the search is also as short as possible.

The present invention also specifies a search method for searching information recording area of optical disk in the optical disk recording/reproduction device, which includes: a spindle motor which rotates an optical disk where recording tracks are formed in a shape of concentric circles or a spiral shape; an optical pickup which irradiates a light for performing the recording and/or reproduction for the optical pickup, receives a reflected light from the optical disk, converts it to an electric signal and outputs the signal; a mobile motor which moves the optical pickup on the optical disk; a focus controller which focuses on a convergent point of the light irradiated from the optical pickup; a tracking controller which tracks on the focused-on light so as to locate it on the optical disk; and an information reading means which reads information recorded on the optical disk based on the electric signal output from the optical pickup, wherein the device focuses on the light from the optical pickup at an outer re-zeroing position only at a prescribed distance from the inner-most side of recording tracks of the optical disk to perform reading of the information from the optical disk when the optical disk is mounted to the device, and the method comprises: moving the optical pickup focused-on at the re-zeroing position to the inward or outward direction of the optical disk as it is focused on and detects the presence or absence of information on the optical disk in real time; breaking the optical pickup to stop and read the information on the optical disk if the existence of information on the desk is detected in the movement to the inward or outward direction; returning the optical pickup when the stop position is a position where the optical pickup goes through the information recording area, and if the reading is impossible, the optical pickup returns from a stop position and moving inward or outward to detect the presence or absence of information on the optical disk; and taking the optical pickup a lower moving velocity than that in the first inward or outward movement after the return and taking an even lower moving velocity nearby a position where the existence of information is detected in the first inward or outward movement.

DESCRIPTION OF THE PREFERRED EMBODIMENTS

Figure 1:
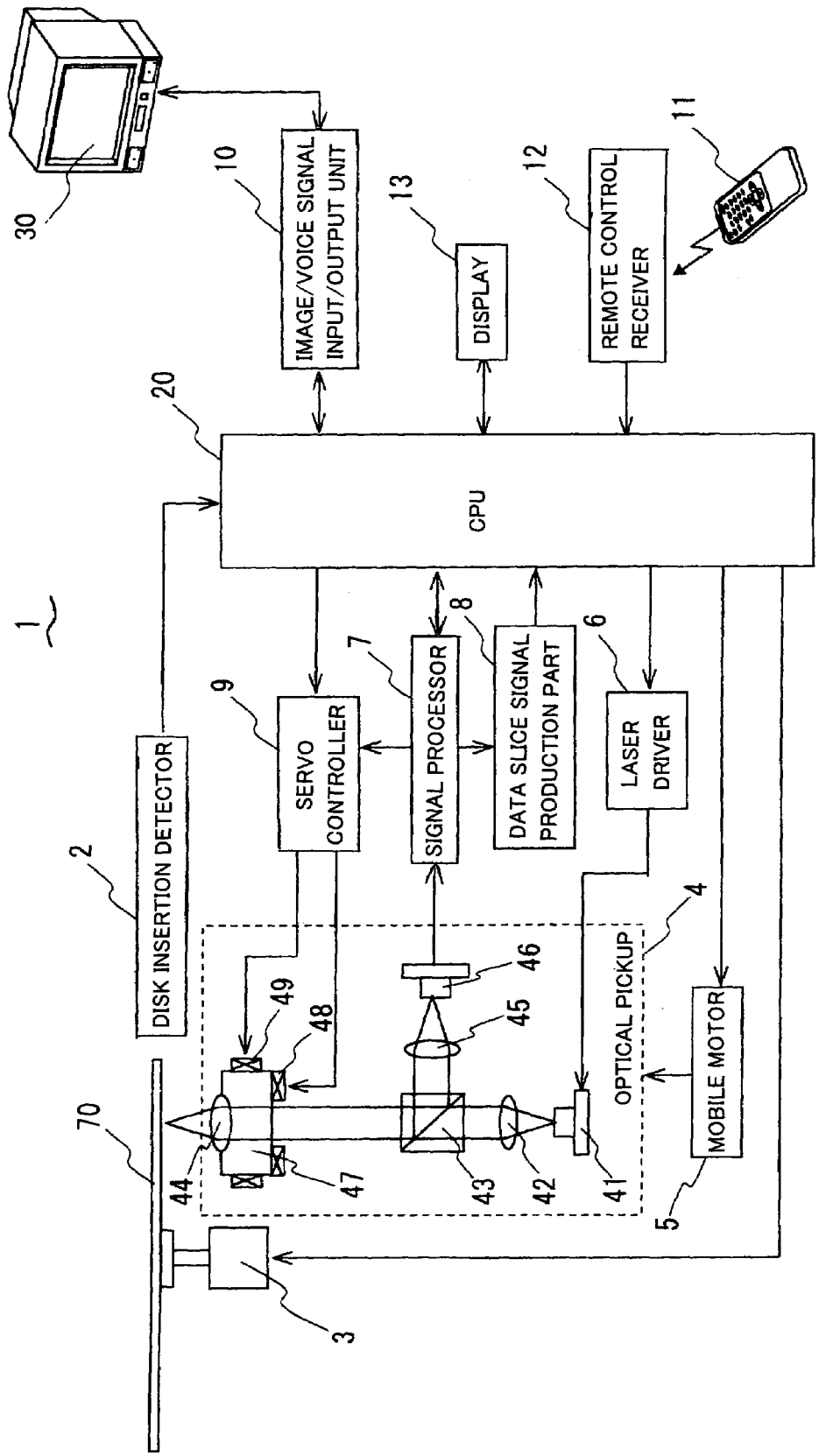
FIG. 1 is an electrical block construction diagram showing the summary construction of an optical disk recording/reproduction device relating to an embodiment of the present invention.

The present invention is described hereinafter, with reference to the drawings of a specific embodiment. First, an electric block diagram of an optical disk recording/reproduction device relating to an embodiment of the present invention is shown in FIG. 1. An optical disk recording/reproduction device 1 is a device which performs the recording and/or reproduction of information such as music and images on an optical disk 70 where concentric or spiral information recording tracks are formed, such as CD (compact disk) or DVD (digital versatile disk).

The optical disk recording/reproduction device 1 has a disk insertion detector 2, a spindle motor 3, an optical pickup 4, a mobile motor 5, a laser driver 6, a signal processor 7, a data slice signal formation unit 8, and a servo controller (focus controller, tracking controller) 9. Moreover, it is provided with a CPU 20 which controls an image/voice signal input/output unit 10, a remote controller 11, a remote controller receiver 12, a display 13 and the above parts (information reading means, initial operation means, information detection means, and information recording area search means).

The disk insertion detector 2 detects that the optical disk 70 is inserted from a non-illustrated disk insertion part and the signal is input into CPU 20. The inserted optical disk 70 is mounted to the spindle motor 3. The spindle motor 3 is rotationally driven under control by CPU 20, and the mounted optical disk 70 is rotated.

The optical pickup 4 irradiates light for performing the recording and/or reproduction of information onto the optical disk 70, receives reflected light from the optical disk 70 and converts it to an electric signal, and the optical pickup 4 is radially moved to the optical disk 70 by the mobile motor 5 under the control of the CPU 20.

The optical pickup 4 converges and irradiates light emerged from a semiconductor laser 41 onto the optical disk 70 via a collimator lens 42, a beam splitter 43 and an objective lens 44. Reflected light from the optical disk 70 is received by a photo-detector 46 via an objective lens 44, a beam splitter 43 and a converging lens 45.

The light emission of the semiconductor laser 41 is controlled by the laser driver 6 under the control of the CPU 20. The photo-detector 46 is constructed from divided photo-diodes in which the light-receiving surface is divided into multiple regions, electric signals corresponding to the light-receiving intensity are output for each light-receiving surface, and the output signals from the photo-detector 46 are input into the signal processor 7.

The objective lens 44 is held in a lens holder 47, in which are a provided focusing coil 48 and a tracking coil 49. The focusing coil 48 moves the objective lens 44 in a direction perpendicular to the surface of optical disk 70 by the magnetic action of a non-illustrated magnet. The tracking coil 49 similarly moves the objective lens 44 in a direction perpendicular to the recording tracks of optical disk 70 in parallel to the surface of optical disk 70.

The signal processor 7 produces an RF signal (reflection intensity) based on an output signal from the photo-detector 46 and outputs it to the data slice signal formation unit 8. The data slice signal formation unit 8 produces a data slice signal binarylizing the RF signal and inputs it into the CPU 20, where pits formed on the optical disk 70 are detected based on the data slice signal.

The signal processor 7 produces a focus error signal and a track error signal based on the output signal from the photo-detector 46 and outputs the signals to the servo controller 9. The focus error signal is a signal corresponding to the deviation of convergent point of the light irradiating on the optical disk 70 via the objective lens 44 from the optical disk 70 surface, and the track error signal is a signal corresponding to the deviation of the convergent point from the recording tracks. The servo controller 9 controls the current supply to the focusing coil 48 and the tracking coil 49 based on the focus error signal and track error signal to move the objective lens 44 and thereby performs servo control so that the convergent point is located on the optical disk 70 surface and the recording tracks.

A display 30 and external devices such as a speaker and a TV receiver are connected to the voice/image signal input/output unit 10 to carry out the output of an image signal and a voice signal reproduced from the optical disk 70 and the input of an image signal and a voice signal from the external devices.

The remote controller 11 operates various actions of the optical disk recording/reproduction device 1 and has operating keys (not illustrated) for operating the various actions. The remote controller 11 transmits corresponding signals with an IR signal in accordance with the operation of the various keys. The remote control receiver 12 receives the IR signal sent from the remote controller 11 and outputs the signal to CPU 20. A display 13 is provided at the front panel of the main body of the optical disk recording/reproduction device 1 and displays the contents operated by the remote controller 11 and operating conditions of the optical disk recording/reproduction device 1.

The recording/reproduction of information for the optical disk 70 is described below. First, in the reproduction of information from the optical disk 70, light from the semiconductor laser 41 is irradiated onto the optical disk 70 while rotating the optical disk 70 with the spindle motor 3, and its reflected light is received by the photo-detector 46. Then, the servo controller 9 controls the current supply to the focusing coil 48 to move the objective lens 44 based on the focus error signal from the signal processor 7 and focuses on (focus leads in) the convergent point from the semiconductor laser 41 so as to locate it on the optical disk 70 surface. Moreover, the servo controller 9 controls the current supply to the tracking coil 49 to move the objective lens 44 based on the track error signal from the signal processor 7 and tracks on (track leads in) the convergent point from the semiconductor laser 41 so as to locate it on a desired recording track.

After the convergent point is focused on and tracked on, the servo controller 9 controls the current supply to the focusing coil 48 and the tracking coil 49 and performs focusing servo control and tracking servo control so as to keep the coils in the focused-on and the tracked-on state based on the focus error signal and the track error signal.

The RF signal output from the signal processor 7 is then input into the data slice signal formation unit 8 in these servo states, and the data slice signal produced by binarylizing the RF signal by the data slice signal formation unit 8 is input into CPU 20. CPU 20 detects the presence or absence of pits formed on the optical disk 70 based on the data slice signal, reads the information recorded on the optical disk 70, reproduces the read information to an image signal and a voice signal and outputs them from the image/voice signal input/output unit 10 to the external devices.

Moreover, the recording of information to the optical disk 70 is similarly carried out by forming pits on the optical disk 70 with a light from the semiconductor laser 41 in the focusing and tracking servo states. At this time, the image signal and the voice signal input from the image/voice signal input/output unit 10 are coded by CPU 20, and the semiconductor laser 41 controls the light emission in accordance with the coded data under the control of CPU 20, by which pits corresponding to the coded data are formed on the recording tracks of optical disk 70 to record the image and voice information. The formation of pits is enabled by allowing the semiconductor laser 41 to emit light at a higher output than that in reading the information.

The optical disk recording/reproduction device 1 thus constructed performs the reproduction of information from the optical disk 70, the recording of information on the optical disk 70, etc. by operating the remote controller 11 under the control of the CPU 20. If the optical disk 70 is inserted under the control of the CPU 20, the optical disk recording/reproduction device 1 performs the initial operation for reading information recorded at the inner-most side of optical disk 70, and determines the type and recording contents of inserted optical disk 70 based on the information read by the initial operation and controls subsequent operations such as recording and reproduction of information.

Figure 2:
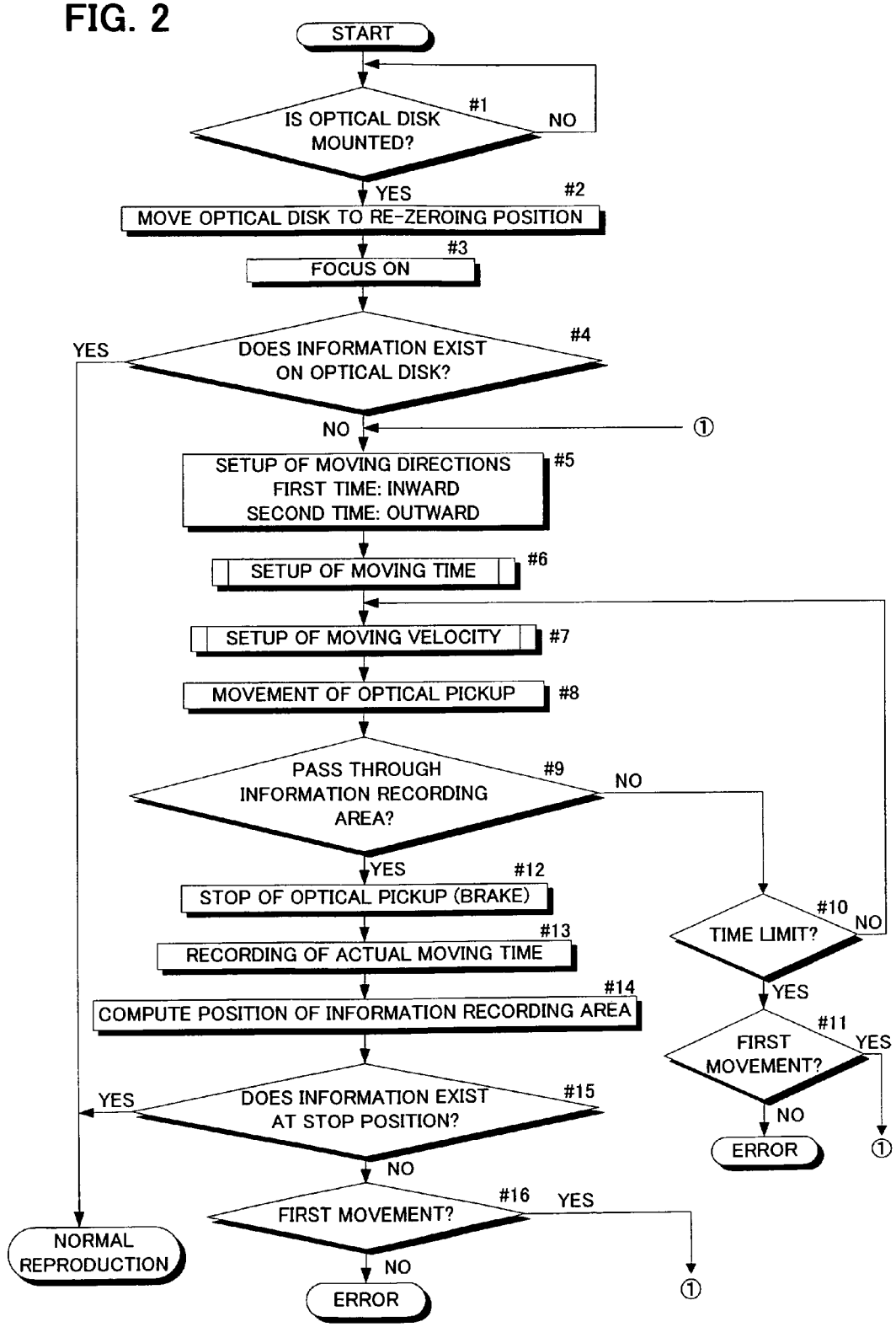
FIG. 2 is a flow chart showing a procedure in the initial operation of the same device.

The initial operation of the optical disk recording/reproduction device 1 at the time of inserting the optical disk 70 is described hereinafter with reference to the flow chart of FIG. 2. First, whether the optical disk 70 is inserted (mounted) is determined by the disk insertion detector 2 in the optical disk recording/reproduction device 1 (#1).

Figure 5:
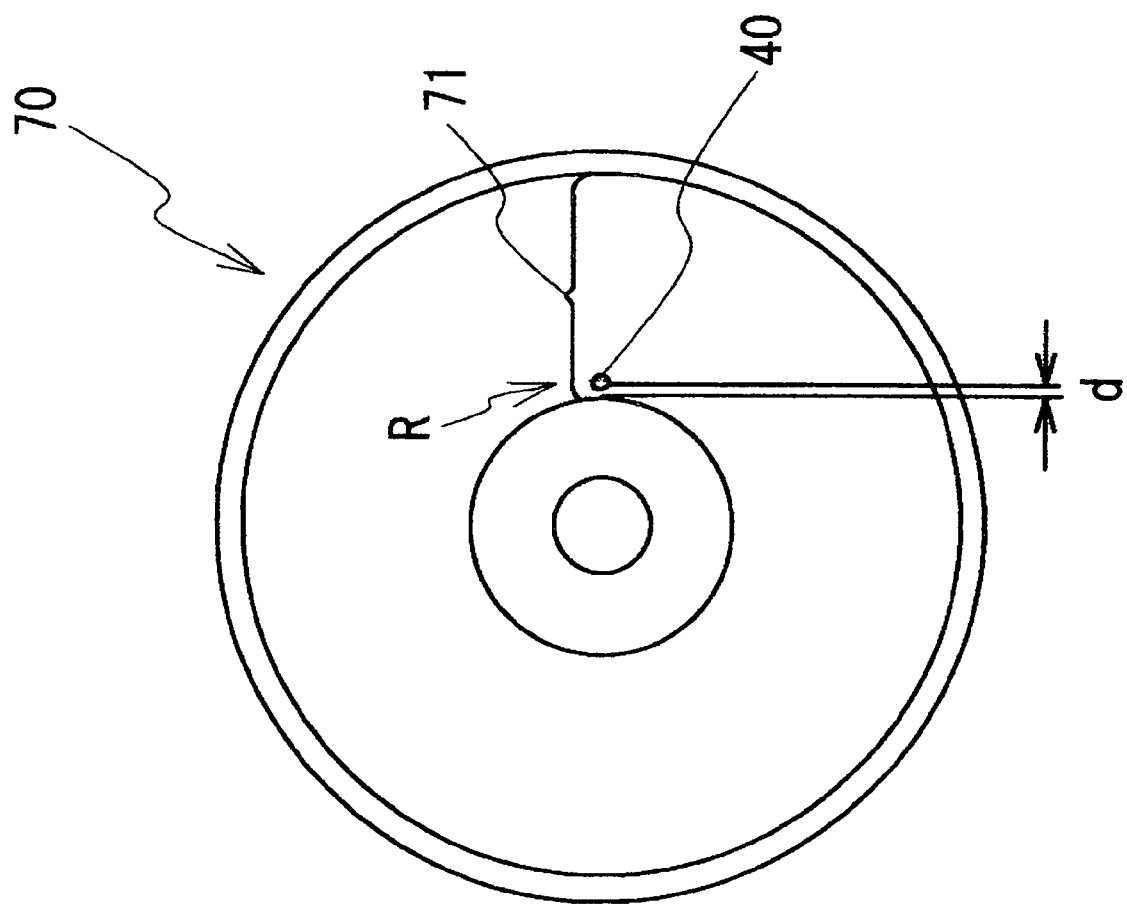
FIG. 5 is a diagram showing the position of optical pickup in the initial operation of the same device in connection with an optical disk.

If the optical disk 70 is inserted (YES in #1), the initial operation is started, the optical disk 70 is rotated by the spindle motor 3 and the optical pickup 4 is moved to a pre-determined re-zeroing position by means of mobile motor 5 (#2), and light from the optical pickup 4 is focused onto the optical disk 70 (#3). Here, the re-zeroing position R is a position at which a light spot 40 of a light from the optical pickup 4 is irradiated onto an outward location only at a pre-determined distance d from the inner-most side of a recordable area 71 of the optical disk 70 when the light is focused as shown in FIG. 5. Moreover, a mechanical switch (not shown) is fixed to the inner-most position in the optical disk recording/reproduction device 1, and the inner-most position (the end of a moving stroke of optical pickup 4) is defined by bringing the optical pickup 4 into contact with the mechanical switch. The re-zeroing position R is an outer position only at a distance d from the inner-most position.

Next, the presence or absence of information formed by the optical disk 70 is determined based on the data slice signal output from the data slice signal formation unit 8 in the focused-on state (#4). If the information exists (YES in #4), the flow shifts to normal reproduction in its existent state; if the information does not exist (No in #4), the flow shifts to the next step as the focused-on state is maintained. In this instance, the presence or absence of information means the presence or absence of pits formed on the optical disk 70 surface, and if CPU 20 confirms the predetermined binarylized data from the data slice signal formation unit 8, the information exists.

When the presence of formation is not confirmed (No in #4), the optical pickup 4 sets up a moving direction (#5), a moving time (#6) and a moving velocity (#7) and starts a radial moving of optical disk 70 (#8). The movement of optical pickup 4 is started by a rotation driving command from the CPU 20 to the mobile motor 5, and the change of moving velocity is made by a control command from the CPU 20 to the mobile motor 5. For the setup of moving velocity (#5), the first moving direction is the inward direction of optical disk 70, and the second moving direction is the outward direction in this embodiment. Taking the first moving direction as the inward direction is based on empirical knowledge such that very little information exists more frequently on the inner side than in the re-zeroing position R, but it is not necessarily limited, and the first moving direction may also be the outward direction and the second moving direction may also be the inward direction.

Figure 3:
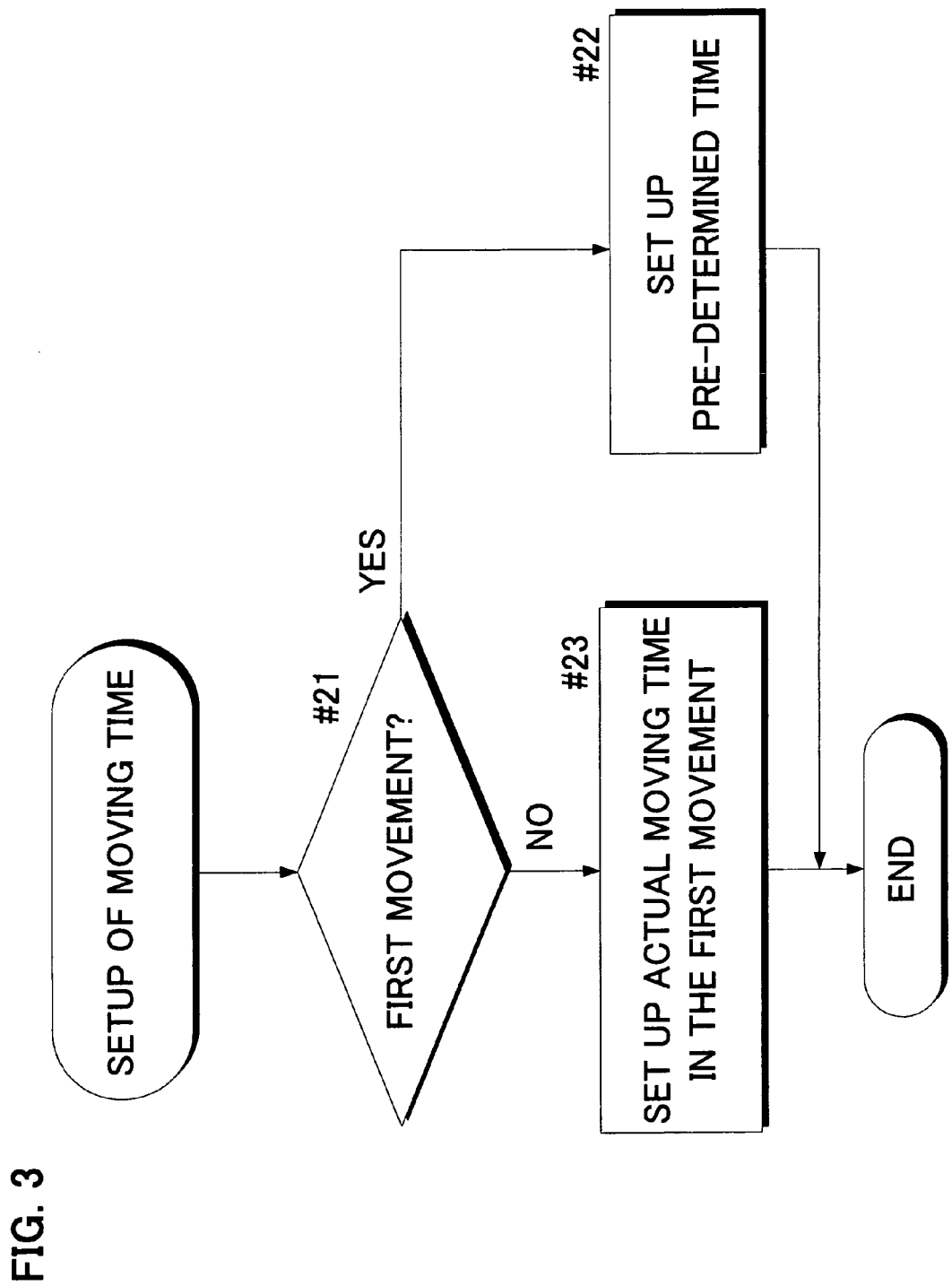
FIG. 3 is a flow chart showing a procedure for setting up the moving time of an optical pickup in the initial operation of the same device.

The setup of the moving time is described in the flow chart of FIG. 3. First, whether a movement is the first movement is determined (#21), if it is the first movement (YES in #21), a fixed time pre-determined for a memory in CPU 20 is set up (#22). If it is not the first movement, namely, it is the second movement after a return described later (NO in #21), the actual moving time during the first inward movement is set up (#23). The actual moving time during the first movement is described in detail later. The predetermined time is set to a time shorter than the time needed for the optical pickup 4 to reach the mechanical switch (non-illustrated) provided by fixing it to the inner-most position of device 1 when the optical pickup 4 moves from the re-zeroing position R to the inner side of optical disk 70.

Figure 4:
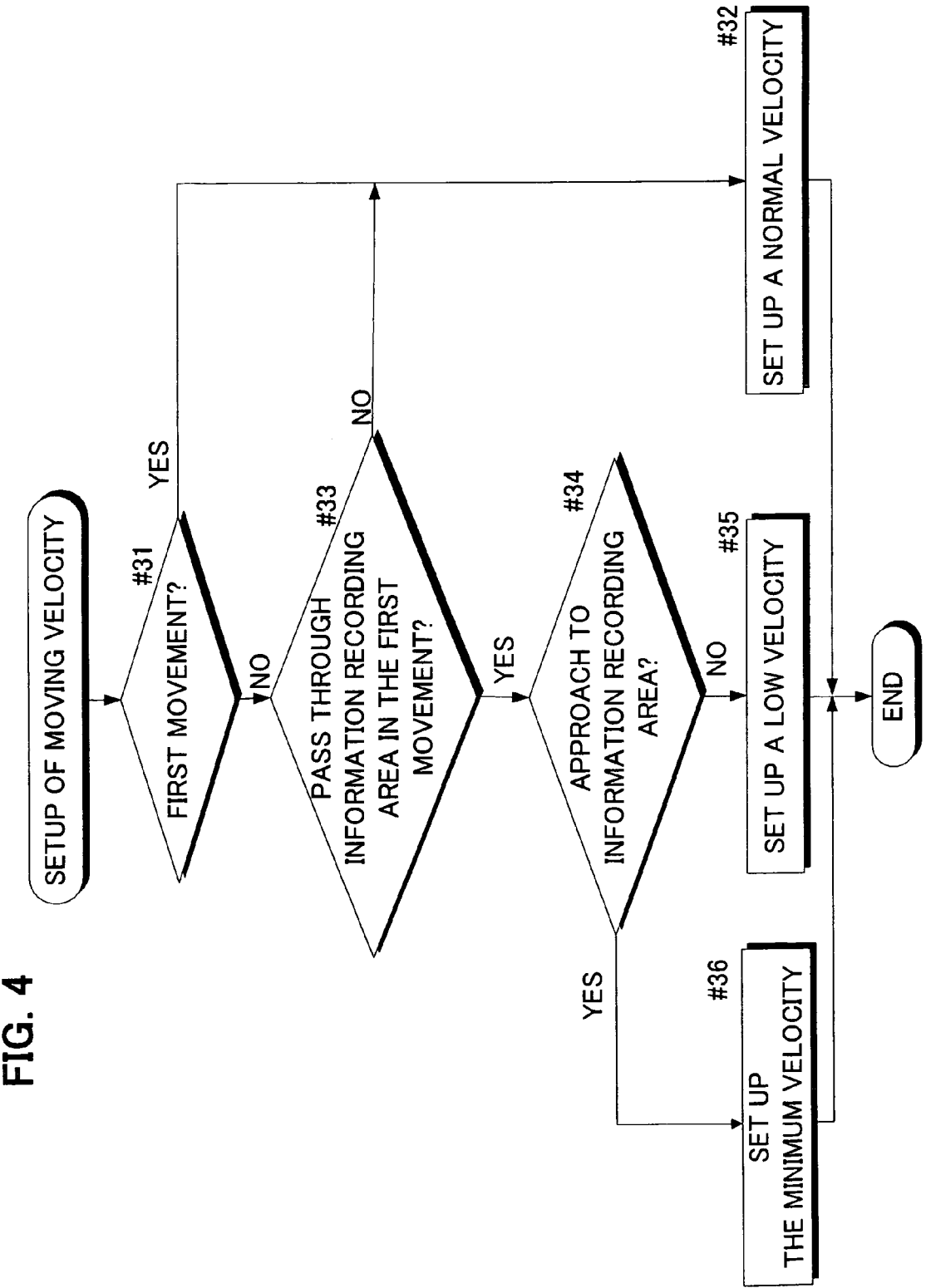
FIG. 4 is a flow chart showing a procedure for setting up the moving velocity of an optical pickup in the initial operation of the same device.

The setup of moving velocity is described according to a flow chart of FIG. 4. First, whether a movement is the first movement is determined (#31), if it is the first movement (YES in #31), a normal velocity (a higher velocity) is set up (#32). If it is not the first movement, namely, a case of second movement after a return (NO in #31), it will be described in detail later.

As described above, for the first movement, the moving direction is set to the inward direction (#5), the moving time is set to a pre-determined time (#6) and the moving velocity is set to a normal velocity (#7), the optical pickup 4 starts the movement as these settings (#8), and a determination is made as to whether the optical pickup 4 passes through the information recording area E in the movement (#9). Here, the information recording area E means a region where pits are formed on the optical disk 70 surface, as shown schematically in FIG. 6. If there is little information, the number of tracks sometimes are only one to a few, and whether the optical pickup 4 has passed (or is passing) through the information recording area E can be discriminated by the CPU 20 based on the changes of waveform of an RF signal from the signal processor 7 by monitoring the signal in real time. Moreover, whether the optical pickup 4 has passed (or is passing) through the information recording area E can be discriminated based on a bright signal and a track cross-signal in addition to the waveform of RF signal.

When the setting time is over (YES in #10) before the optical pickup 4 passes through information recording area E (NO in #9), whether it is the first movement is determined (#11), and if it is the first movement (YES in #11), the moving direction (#5), the moving time (#6) and the moving velocity (#7) are set up again to start the second movement (#8). The second movement is described in detail later.

Figure 6:
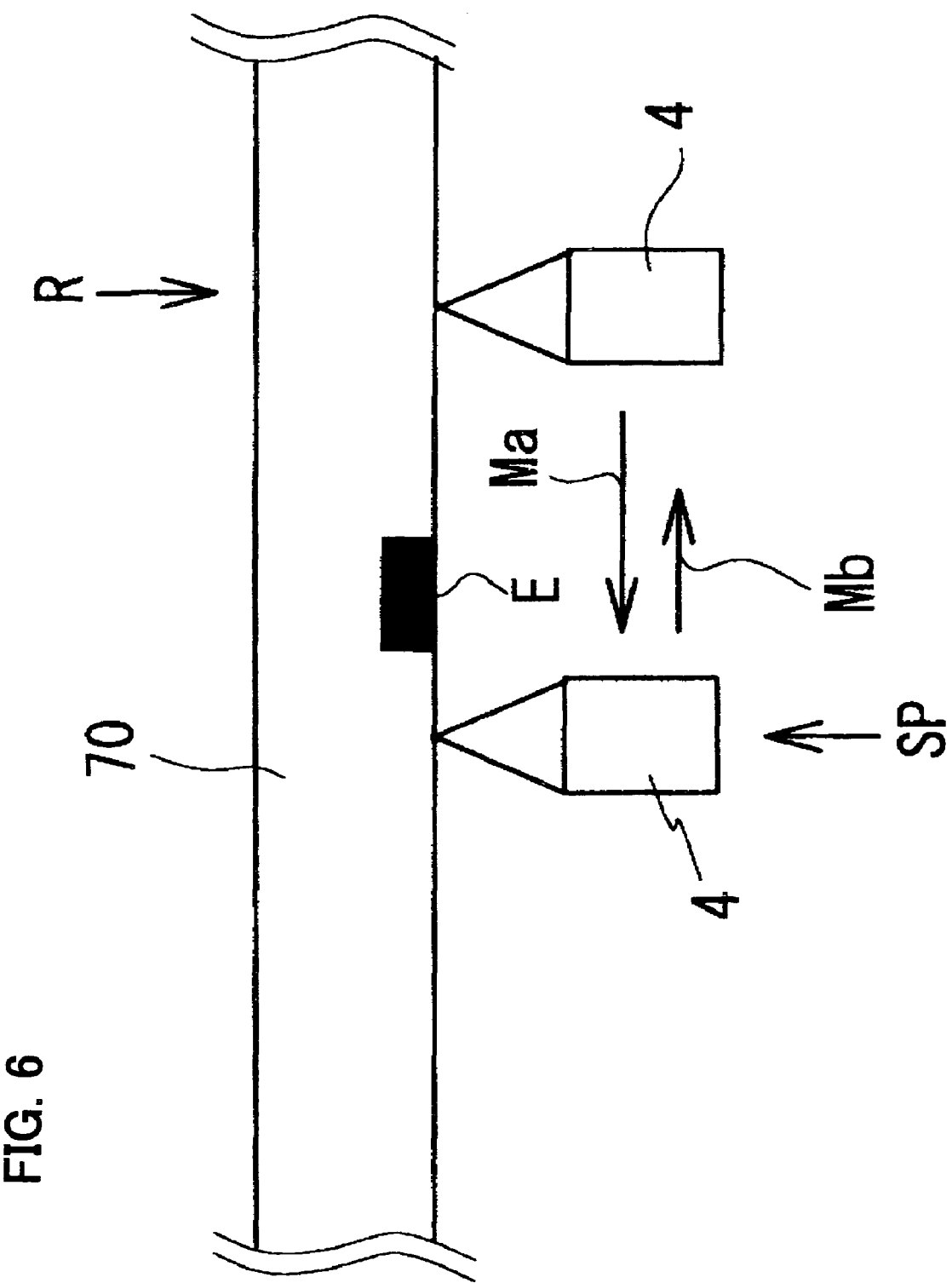
FIG. 6 is a diagram showing the operation of optical pickup in the initial operation of the same device.

As shown in FIG. 6, if there is an information recording area E on the optical disk 70 and the optical pickup 4 has passed (or is passing) through the area E in the movement to the inside direction (in the first movement Ma) (YES in #9), CPU 20 issues a stop command to the mobile motor 5 and brakes the optical pickup 4 to stop it (#12), computes the actual moving time for the optical pickup 4 to start and then stop, and records the value in the memory of CPU (#13).

Moreover, as described above, CPU 20 can recognize the related start time of movement, stop time and the passing time of the information recording area E, and therefore computes the position of the information recording area E and stores it as time information (#14).

Then, the optical pickup 4 determines whether information exists on the optical disk 70 at the stopped position (#15), and if information exists, the flow shifts to the normal reproduction in its existent state. If information does not exist (NO in #15), a determination is made as to whether the movement is the first movement; and if it is the second movement (NO in #16), an error occurs. If it is the first movement (YES in #16), the moving direction (#5), the moving time (#6) and the moving velocity (#7) are set up to start the second movement (#8). Here, when the optical pickup 4 cannot confirm the existence of information at the stopped position, and as shown schematically in FIG. 6, a case in which the optical pickup 4 cannot be instantly stopped even by braking to Ma in the first inward movement of optical pickup 4, and the optical pickup 4 has passed through the information recording area E and stopped is possible. When the information recording area E is an extremely narrow range (one to several tracks), it is considered to be a frequent phenomenon. On the other hand, when the information recording area E has a fair width, the information recording area E does not offset even if the optical pickup 4 moves for some braking distance and stops, therefore it can confirm the existence of information.

Next, a case that the optical pickup 4 cannot confirm the existence of information at the stopped position (NO in #15) and carries out the second movement is described. First, the moving direction is re-set up. Once it has stopped, the outward direction is set up because this is the second movement (#5). Then, the actual moving time in the first movement is set up as the upper limit of the second moving time (#23) because this is the second movement (NO in #21). The actual moving time in the first movement is stored in step #13. The upper limit of moving time in the second movement is adopted as the actual time in the first movement so that the moving distance of optical pickup 4 in the second movement is made equal to the moving distance of optical pickup 4 in the first movement. In other words, the optical pickup 4 is braked to a stop with the passage of the information recording area E in the first movement, ends the movement in a time shorter than the moving time set in the step #22 and returns for only the same distance as this short moving time (moving distance) in the second movement.

Next, the moving velocity in the second movement is explained by returning to the flow chart of FIG. 4. First, the optical pickup 4 has passed through the information recording area E in the first movement, therefore the determination becomes NO in the step #31 and YES in the step #33. If the optical pickup 4 approaches to the information recording area E (YES in #34), the minimum velocity is set up (#36); if it has not approached to the information recording area E (NO in #34), a low velocity is set up (#35). Here, the optical pickup 4 computes and records the position of the information recording area E as time information in the step #14 in the first movement, and whether it approaches to the information recording area E can be determined based on the time information. For example, when the actual moving time in the first movement is t1 and the time for passing through the information recording area E is t2 after the start of the first movement, a time (t1-t2) after the start of the second movement is a time for approaching to the information recording area E. However, when the moving velocity in the first movement and the moving velocity in the second movement are different, a correction of velocity change becomes necessary for the above time (t1-t2).

As described above, if the moving direction, moving time and moving velocity in the second movement after the return are set up, the optical pickup 4 starts the movement again (#8) and passes through the information recording area E, the optical pickup 4 is braked to a stop (#12). In the second movement after this return, as described above, the moving velocity is set to a low velocity from the beginning and, if it approaches to the information recording area E, it is set to the minimum velocity. CPU 20 detects the passage of the information recording area E based on the change of the RF signal, etc., and then the stop position of the optical pickup 4 does not pass through the information recording area E and is offset even if the optical pickup 4 is braked to a stop. Namely, as shown in FIG. 6, the stop position SP after the first inward movement Ma is frequently a position at which the information recording area E is slightly offset from the beginning, and the moving velocity of the return movement (second movement) Mb from the stop position SP is a low velocity (the minimum velocity if it approaches the information recording area E), therefore the second stop position comes to within the information recording area E even if the optical pickup 4 stops somewhat slowly with a command from the CPU 20. Accordingly, information is normally read at the stop position after this second movement and then the flow shifts to the normal reproduction.

As described above, the information recording area E can be surely searched and read in the optical disk recording/reproduction device 1 of this embodiment even if only extremely small information of about several tracks is recorded and the optical disk 70 has an extremely small size of information recording area E. Moreover, even if the second movement after return is carried out, the stop position after the first movement is a position close to the information recording area E and the switching to the minimum velocity for surely searching the information recording area E is conducted first nearby the position where the information recording area E is detected in the first movement and, therefore, a time required for the search is also as short as possible.

Moreover, in the above embodiment, a case that the existence of information cannot not be confirmed at a stop position after the second movement is taken as an error, but when the existence of information cannot be confirmed at a stop position after the second movement, the optical pickup 4 may return and carry out a movement to the reverse direction (inward) while it further detects the presence or absence of information on the optical disk 70 surface in real time.

This application is based on Japanese patent application 2004-256405 filed Sep. 3, 2004, the contents of which are hereby incorporated by reference.

What is claimed is:

1. An optical disk recording/reproduction device having a spindle motor which rotates an optical disk where recording tracks are formed in a share of concentric circles or a spiral shape,
   an optical pickup which irradiates a light for performing the recording and/or reproduction of information for the optical pickup, receives a reflected light from the optical disk, converts it to an electric signal and outputs the signal,
   a mobile motor which moves the optical pickup on the optical disk, a focus controller which focuses on a light irradiated from the optical pickup so as to locate a convergent point of the light on the optical disk,
   a tracking controller which tracks on the focused-on light so as to locate it on the recording tracks,
   an information reading means which reads information recorded on the optical disk based on the electric signal output from the optical pickup in the tracked-on state, and
   an initial operation means which focuses on and tracks on the light from the optical pickup at an outer re-zeroing position only at a defined distance from the inner-most side of recording tracks of the optical disk when the optical disk is mounted to the device, and performs the reading of information from the optical disk,
   the device comprises:
   the initial operation means includes;
   an information detection means which detects the presence or absence of information recorded on the optical disk based on an output signal from the optical pickup in the focused-on state, and an information recording area search means which performs the reading of the tracked-on information if information exists on the optical disk as a result of detection at the re-zeroing position by the information detection means, detects the presence or absence of information by the information detection means in real time while moving the optical pickup in inward or outward direction of the optical disk in the focused-on state if no information exists on the optical disk, and stops the optical pickup to an area having information on the optical disk;

the information recording area search means includes;

a moving means of optical pickup which repeatedly moves the optical pickup from the inward to the outward direction of optical disk or from the outward to the inward direction of optical disk while detecting the presence or absence of information by the information detection means, and a stopping means of the optical pickup which stops the movement of optical pickup if the information recording area having information is detected on the optical disk by the information detection means, wherein the moving means of optical pickup repeatedly moves the optical pickup from the inward to the outward direction of optical disk or from the outward to the inward direction of optical disk until the information recording area is detected by the information detection means and, when the stop position of optical pickup after the information recording area is detected by the information detection means has passed through the information recording area and the information is unreadable, the moving velocity is switched to a low velocity and the return movement is further repeated.

2. An optical disk recording/reproduction device having a spindle motor which rotates an optical disk where recording tracks are formed in a shape of concentric circles or a spiral shape, an optical pickup which irradiates a light for performing the recording and/or reproduction of information for the optical disk, receives a reflected light from the optical disk, converts it to an electric signal and outputs the signal, a mobile motor which moves the optical pickup on the optical disk, a focus controller which focuses on a light irradiated from the optical pickup so as to locate a convergent point of the light on the optical disk, a tracking controller which tracks on the focused-on light so as to locate it on the recording tracks, an information reading means which reads information recorded on the optical disk based on the electric signal output from the optical disk in the tracked-on state, and an initial operation means which focuses on and tracks on the light from the optical pickup at an outer re-zeroing position only at a defined distance from the inner-most side of recording tracks of the optical disk when the optical disk is mounted to the device, and performs the reading of information from the optical disk, the device comprises:

the initial operation means includes;

an information detection means which detects the presence or absence of information recorded on the optical disk based on an output signal from the optical pickup in the focused-on state, a first optical pickup moving means which detects the presence or absence of information at the re-zeroing position by the information detection means and moves the optical pickup to the inward or outward direction of optical disk while performing the reading of information in the tracked-on state if information exists as a result of the detection and while detecting the presence or absence of information if no information exists, a first moving time setting means which sets the upper limit of moving time by the first optical pickup moving means to a pre-determined time, a first optical pickup stopping means which breaks the movement of optical pickup to stop if the information recording area having information on the optical disk is detected by the information detection means in the movement given by the first optical pickup moving means, an information recording area position storing means which stores the position of optical pickup as time information from a start of movement, at a time if the information recording area having information on the optical disk is detected by the information detection means in the movement given by the first optical pickup moving means, a second optical pickup moving means which performs the reading of the tracked-on information if the information exists on the optical disk as a result of detection by the information detection means at a position the optical pickup is braked to a stop by the first optical pickup stopping means, and moves the optical pickup to the outward or inward direction reverse to the moving direction given by the first optical pickup moving means if no information exists, a second moving time setting means which sets the moving time given by the second optical pickup moving means to a time same as the actual moving time of optical pickup given by the first optical pickup moving time, a moving velocity setting means which sets the moving velocity given by the second optical pickup moving means to a normal velocity if the information recording area is not detected in the movement given by the first optical pickup moving means and sets the moving velocity to a velocity lower than the normal velocity if the information recording area is detected, a moving velocity switching means which sets the moving velocity given by the second optical pickup moving means to the minimum velocity at a position where the information recording area is detected based on the time information stored by the information recording area position storing means, and a second optical pickup stopping means which brakes the movement of optical pickup to stop it if an information recording area having information is detected on the optical disk by the information detection means.

3. A method for searching information recording area of optical disk in the optical disk recording/reproduction device, which includes:

a spindle motor which rotates an optical disk where recording tracks are formed in a shape of concentric circles or a spiral shape;

an optical pickup which irradiates a light for performing the recording and/or reproduction of information for the optical pickup, receives a reflected light from the optical disk, converts it to an electric signal and outputs the signal;

a mobile motor which moves the optical pickup on the optical disk;

a focus controller which focuses on a light irradiated from the optical pickup so as to locate the convergent point of the light on the optical disk;

a tracking controller which tracks on the focused-on light so as to locate it on the recording tracks; and an information reading means which reads information recorded on the optical disk based on the electric signal output from the optical pickup, wherein the device focuses on the light from the optical pickup at an outer re-zeroing position only at a defined distance from the inner-most side of recording tracks of the optical disk to perform reading of the information from the optical disk when the optical disk is mounted to the device, and the method comprises:

moving the optical pickup focused-on at the re-zeroing position to the inward or outward direction of the optical disk as it is focused on and detecting the presence or absence of information on the optical disk in real time;

breaking the optical pickup to stop and read the information on the optical disk if the existence of information on the desk is detected in the movement to the inward or outward direction;

returning the optical pickup from a stop position and moving inward or outward to detect the presence or absence of information on the optical disk in real time when the stop position is a position where the optical pickup passes through the information recording area and the reading is impossible; and taking the optical pickup a lower moving velocity than that in the first inward or outward movement after the return and taking an even lower moving velocity nearby a position where the existence of information is detected in the first inward or outward movement.

* * * * *